US006434318B1

(12) United States Patent
Bischel et al.

(10) Patent No.: US 6,434,318 B1
(45) Date of Patent: Aug. 13, 2002

(54) DEVICE AND METHOD FOR VARIABLE ATTENUATION OF AN OPTICAL CHANNEL

(75) Inventors: William K. Bischel, Menlo Park; Tony C. Kowalczyk, Palo Alto, both of CA (US)

(73) Assignee: Gemfire Corporation, Palo Alto, CA (US)

( * ) Notice: Subject to any disclaimer, the term of this patent is extended or adjusted under 35 U.S.C. 154(b) by 63 days.

(21) Appl. No.: 09/630,981

(22) Filed: Aug. 2, 2000

(51) Int. Cl.$^7$ .................................................. G02B 6/00

(52) U.S. Cl. ...................................................... 385/140

(58) Field of Search ............................. 385/140, 16, 14

(56) References Cited

U.S. PATENT DOCUMENTS

| | | | |
|---|---|---|---|
| 3,801,185 A | | 4/1974 | Ramaswamy et al. |
| 3,809,696 A | | 5/1974 | Porret et al. |
| 3,809,732 A | | 5/1974 | Chandross et al. |
| 3,953,620 A | | 4/1976 | Chandross et al. |
| 3,993,485 A | | 11/1976 | Chandross et al. |
| 4,648,687 A | * | 3/1987 | Yoshida et al. ................ 385/16 |
| 4,712,854 A | | 12/1987 | Mikami et al. |
| 5,009,483 A | | 4/1991 | Rockwell, III |
| 5,045,847 A | | 9/1991 | Tarui et al. |
| 5,106,181 A | | 4/1992 | Rockwell, III |
| 5,159,699 A | | 10/1992 | de Monts |
| 5,402,514 A | | 3/1995 | Booth et al. |
| 5,544,268 A | | 8/1996 | Bischel et al. |
| 5,874,187 A | | 2/1999 | Colvin et al. |
| 5,932,397 A | | 8/1999 | Mustacich |
| 5,966,493 A | * | 10/1999 | Wagoner et al. ............. 385/140 |
| 6,035,083 A | | 3/2000 | Brennan, III et al. |
| 6,122,416 A | | 9/2000 | Ooba et al. |
| 6,208,798 B1 | * | 3/2001 | Morozov et al. ............. 385/140 |
| 6,229,949 B1 | * | 5/2001 | Ido et al. ..................... 385/145 |
| 6,236,774 B1 | * | 5/2001 | Lackritz et al. ................ 385/14 |
| 6,282,361 B1 | * | 8/2001 | Nishimura et al. .......... 385/140 |

FOREIGN PATENT DOCUMENTS

| | | |
|---|---|---|
| EP | 0 412 675 A2 | 2/1991 |
| EP | 0 616 234 A2 | 9/1994 |
| EP | 0 642 052 A1 | 3/1995 |
| EP | 0 689 094 A1 | 12/1995 |
| EP | 0 981 064 A1 | 2/2000 |
| EP | 0987580 A1 | 3/2000 |
| GB | 2 191 603 A | 12/1987 |
| WO | WO 92/00185 A1 | 1/1992 |
| WO | WO 98/45759 A1 | 10/1998 |

OTHER PUBLICATIONS

"Variable Optical Attenuator Based on a Cutoff Modulator with Tapered Waveguides in Polymers" by Lee et al, IEEE Journal of Lightwave Technology, vol. 17, No. 12.*

P.R. Ashley and E.A. Sornsin, "Doped optical claddings for waveguide devices with electrooptical polymers", IEEE Photonics Technology Letters, vol. 4, No. 9, Sep. 1992, pp. 1026–1028.

(List continued on next page.)

*Primary Examiner*—Hemang Sanghavi
*Assistant Examiner*—Scott A Knauss
(74) *Attorney, Agent, or Firm*—Haynes, Beffel & Wolfeld; Charles B. Katz

(57) ABSTRACT

A device for variable attenuation of an optical channel includes an elongated core surrounded by a cladding. Optical energy propagating along the longitudinal axis of the core is normally confined thereto by the difference in refractive indices between the core and cladding. The thermo-optic coefficients of the core and cladding are closely matched such that waveguide confinement is substantially invariant with respect to ambient temperature. The device further includes a thermal source arranged above the core. The thermal source is operable to generate a temperature gradient of controllable magnitude along a vertical axis extending through the core. The temperature gradient causes reduction of the local refractive index within the core relative to surrounding regions of the cladding such that a portion of the optical energy is deflected away from the thermal source and extracted from the core.

23 Claims, 7 Drawing Sheets

OTHER PUBLICATIONS

B.L. Booth et al., "Polyguide™ polymeric technology for optical interconnect circuits and components", SPIE, vol. 3005, pp. 238–251.

W.S. Colburn and K.A. Haines, "Volume hologram formation in photopolymer materials", Applied Optics, vol. 10, No. 7, Jul. 1971, pp. 1636–1641.

J.E. Marchegiano et al., "Polyguide™ technology for passive optical interconnects". SPIE, vol. 2690, pp. 361–368.

G.B. McKenna, Chapter 10: Glass formation and glassy behavior, vol. 2: Polymer Properties, C. Booth and C. Price (vol. eds.), Comprehensive Polymer Science: the synthesis, characterization, reactions & applications of polymers, Sir Geoffrey Allen and J.C. Bevington (chairman and deputy chairman of the ed. board), Pergamon Press, Oxford (1989).

Robert H. Wopshall, "MB16. Dry photopolymer film for recording holograms", abstract of presentation, 1971 Spring Meeting, Journal of the Optical Society of America, vol. 61, 1971, p. 649.

Joshi, et al., "Three Dimensional Optical Circuitry Using Two–Photon–Assisted Polymerization," Applied Physics Letters, Jan. 11, 1999, vol. 74, No. 2, pp. 170–172.

F.R. Akkari et al., "Thermo–optic mode extinction modulation in polymeric waveguide structures", Journal of Non–Crystalline Solids, vol.187, 1995, pp. 494–497.

Viitanen and Lekkala, "Fiber Optic Liquid Crystal Displays", SPIE, vol. 1976 High–Definition Video, 1993, pp. 293–302.

* cited by examiner

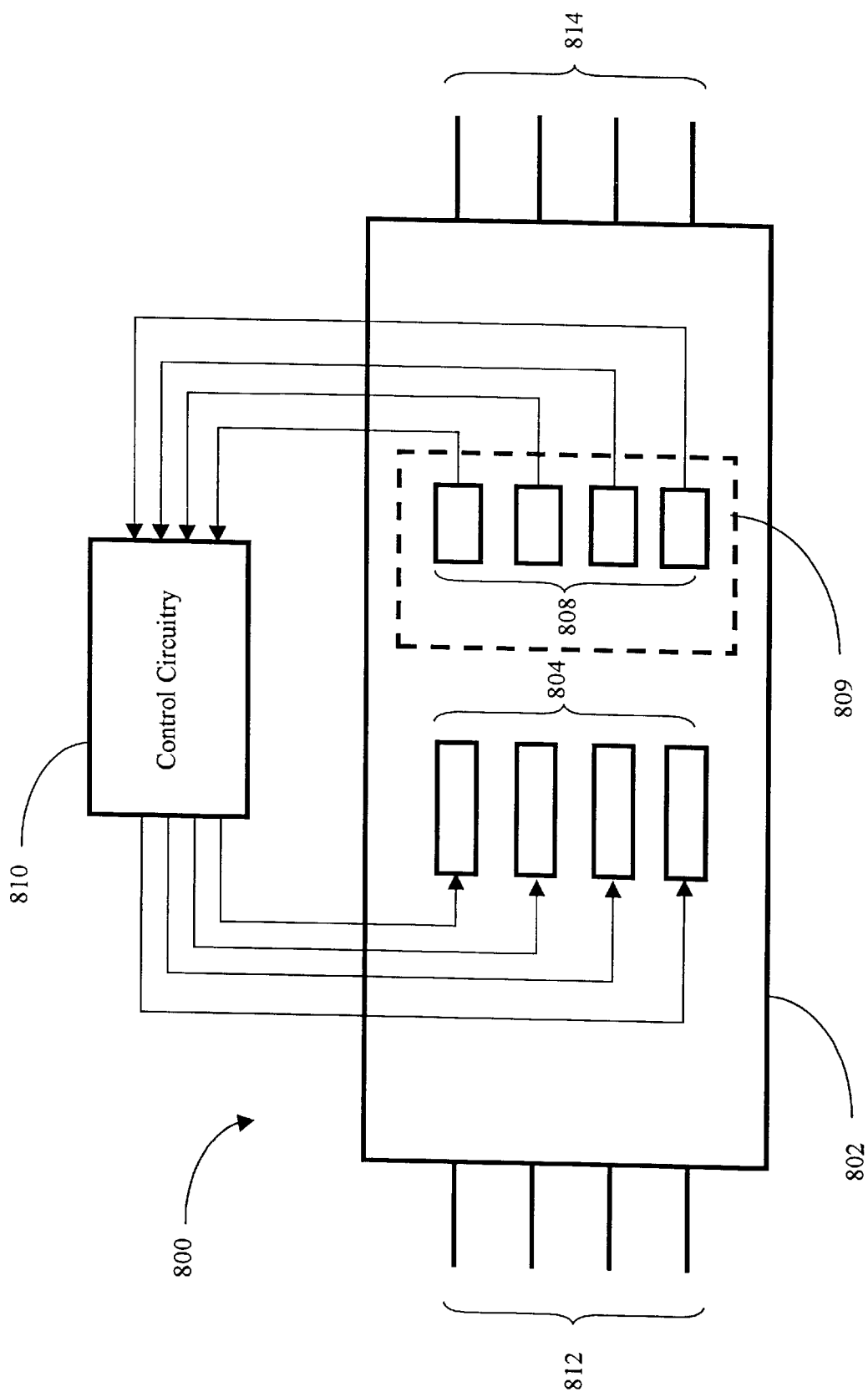

DEVICE AND METHOD FOR VARIABLE ATTENUATION OF AN OPTICAL CHANNEL

BACKGROUND

1. Field of the Invention

The invention relates generally to optical communications, and more specifically to a variable attenuator for removing optical energy from a waveguide in a controllable manner.

2. Description of the Prior Art

The telecommunication industry is making increasing use of optical communication systems for high-bandwidth transmission of voice, video, and data signals. In optical communication systems, it is frequently necessary or desirable to precisely adjust optical signal levels entering various system components. Adjustment of optical signal levels is typically achieved by incorporating variable optical attenuators into the optical circuits. In one example, a variable optical attenuator may be employed to equalize power levels among separate channels of optical circuits implementing wavelength division multiplexing (WDM). Variable optical attenuators may also be employed to avoid exposing optical detectors to excessive signal levels, which may damage the detectors and cause them to become inoperative.

Various references in the prior art disclose attenuators for use in optical circuits. Examples of such attenuators include those described in U.S. Pat. No. 4,762,383 to Yamashita et al. ("Two Dimensional Light Beam Deflectors Utilizing Thermo-optical Effect and Method of Using Same"); U.S. Pat No. 5,881,199 to Li ("Optical Branching Device Integrated with Tunable Attenuators for System Gain/Loss Equalization"), and; U.S. Pat. No. 5,966,493 to Wagoner et al. ("Fiber Optic Attenuators and Attenuation Systems"). The attenuators described in the foregoing references, as well as other prior art attenuators, are known to suffer from operationally significant problems or limitations. These problems include sensitivity to ambient temperature, high power consumption, limited or no adjustability, the occurrence of cross-talk between adjacent channels, high coupling losses, bulkiness and slow responsiveness.

Thus, there is a need in the optical communications art for a variable optical attenuator which overcomes the problems associated with prior art devices.

SUMMARY

In accordance with an embodiment of the invention, a variable optical attenuator is provided having at least one elongated core, a cladding surrounding the core, and a controllable thermal source and a heat sink arranged on opposite sides of the core and defining therebetween a first or vertical axis oriented transversely to the longitudinal axis of the core. The core and cladding collectively form a conventional waveguide structure, which normally confines optical energy propagating along the longitudinal axis of the core by virtue of the difference in refractive indices between the core and cladding. The core and cladding materials are preferably selected such that their thermo-optic coefficients (i.e., dn/dT, where n is the local refractive index and T is temperature) are closely matched within the ambient temperature range of interest. Matching the thermo-optic coefficients of the core and cladding ensures that the waveguide confinement (a function of the difference between the refractive indices of the core and cladding) is substantially invariant with respect to ambient temperature, thereby obviating the need to provide heating or cooling of the waveguide package.

When attenuation of the optical energy propagating along the core is desired, a control signal is applied to the thermal source, which in turn causes a temperature gradient to be developed along the first (vertical) axis extending between the thermal source and the heat sink. The temperature gradient results in a "tilted" or asymmetric refractive index profile within the core wherein the refractive index of the core increases along the first axis from the proximal core-cladding boundary (the boundary nearer to the thermal source) to the distal core-cladding boundary (the boundary more remote from the thermal source). Extraction of optical energy from the waveguide occurs when the local refractive index at the higher-temperature areas of the core (those adjacent the proximal boundary) is depressed below that of the local refractive index of the cladding immediately adjacent to the distal core-cladding boundary. This condition causes at least a portion of the optical energy propagating along the core to be transversely deflected in the direction away from the thermal source (i.e., toward the heat sink). The amount of optical energy extracted from the waveguide is controlled by adjusting the signal (for example, a voltage) applied to the thermal source.

The invention further encompasses an attenuation system, incorporating a variable optical attenuator of the foregoing description, in which a control circuit applies a variable signal to the thermal source in accordance with a desired degree of channel attenuation and with feedback information obtained by monitoring the power level of optical energy traveling through the core. The attenuator and attenuation system of the present invention may be advantageously employed in any number of optical circuit applications where it is necessary or desirable to control optical power transmission within individual optical channels.

BRIEF DESCRIPTION OF THE FIGURES

In the accompanying drawings:

FIG. 8 is a block diagram of an attenuation system, in accordance with one embodiment of the invention.

DETAILED DESCRIPTION

The present invention generally provides a device and method for variable attenuation of an optical channel wherein optical energy is controllably extracted from a waveguide in a preferred direction by generating a temperature gradient along an axis transverse to the longitudinal axis of the waveguide (it should be noted that the term "optical energy", as used herein, denotes electromagnetic energy in general without limitation to specific wavelengths or spectral windows). The device is constructed to avoid problems associated with prior art devices, including sensitivity to ambient temperature, thermal cross-talk between adjacent optical channels, and high power consumption. Suitable uses of the device include, without limitation, equalization of optical power levels in input channels of a wavelength division multiplexer device.

Figure 1:
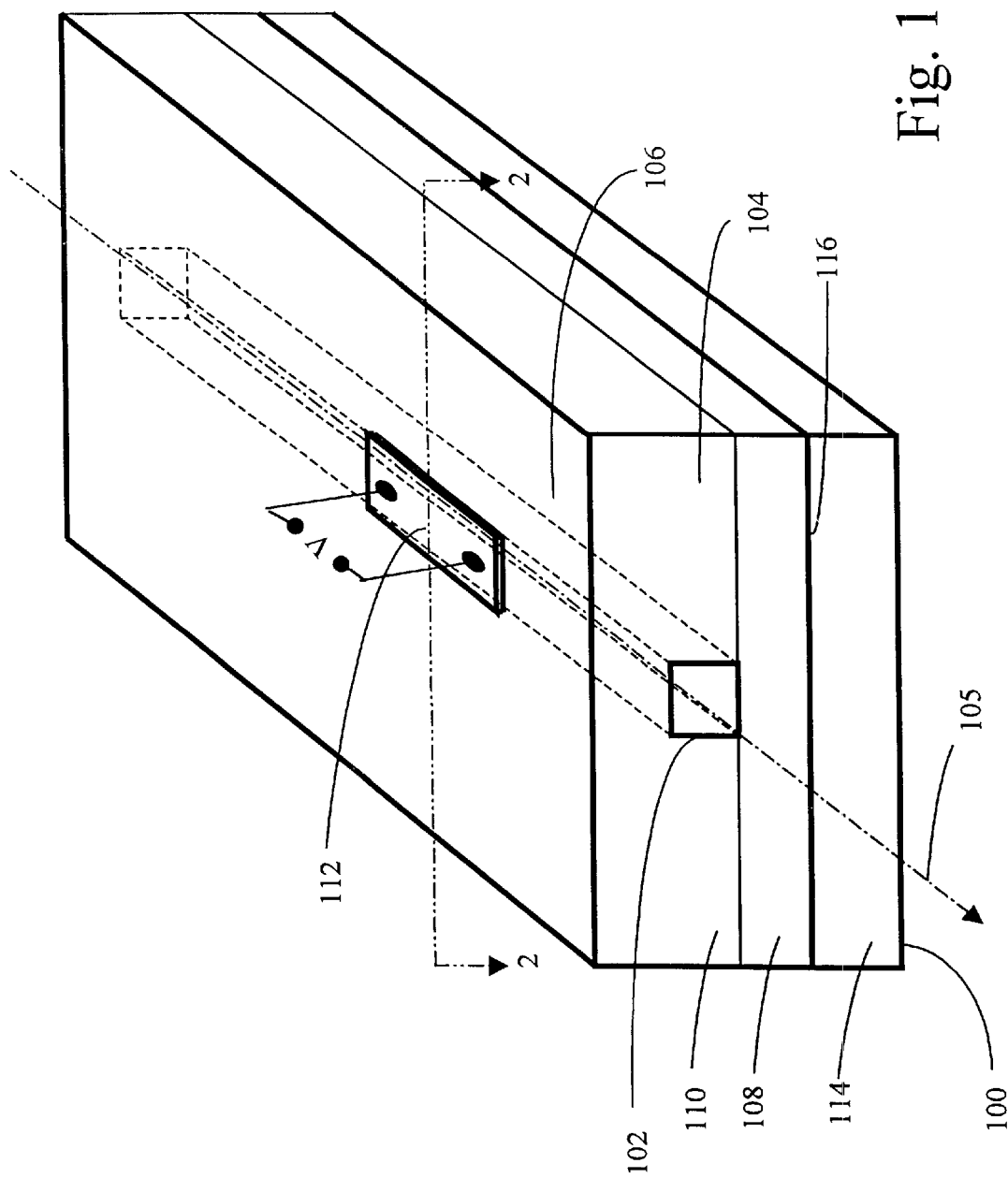
FIG. 1 is a schematic view of a device for variable attenuation of an optical channel, in accordance with a general embodiment of the invention.
Figure 2:
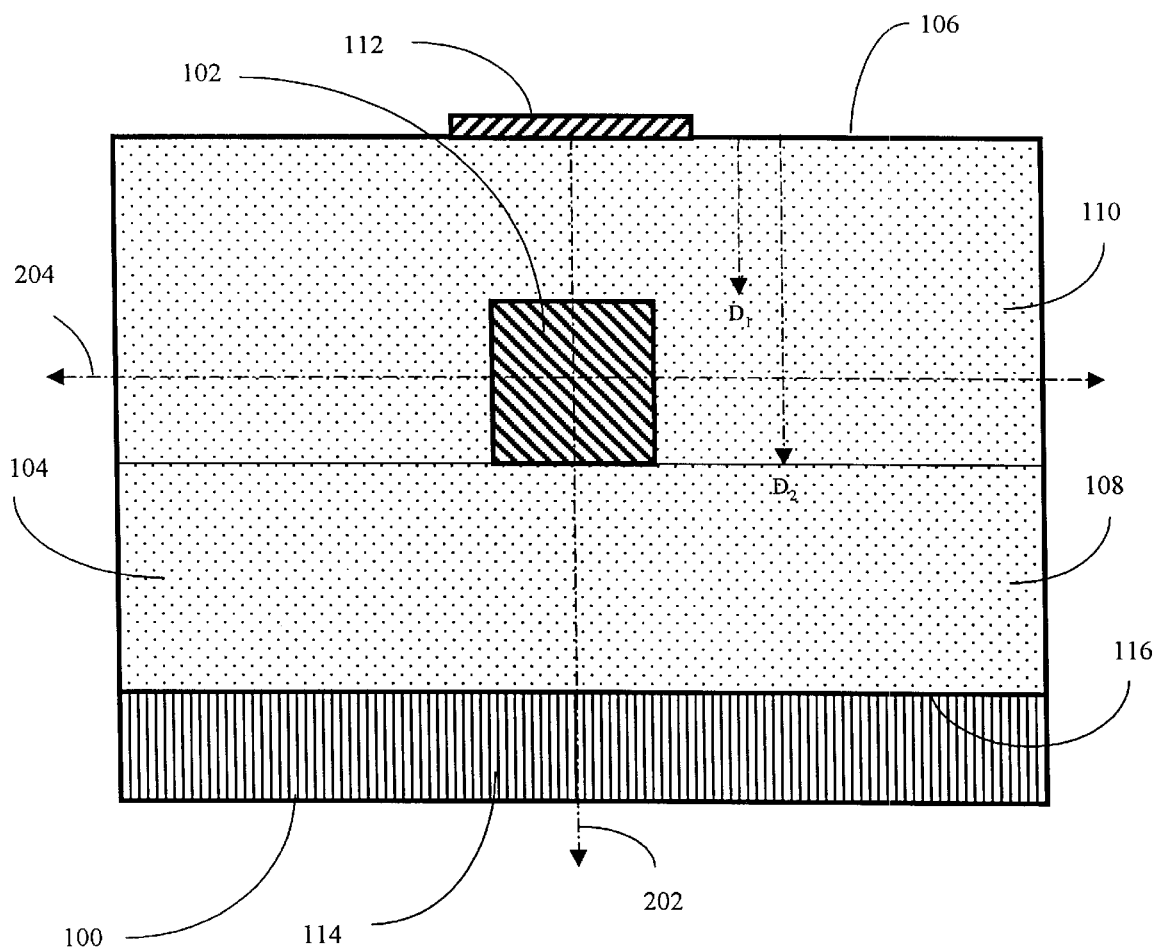
FIG. 2 is a cross-sectional view of the FIG. 1 device.

FIGS. 1 and 2 depict elements of a variable optical attenuator device (hereinafter "VOA") 100 in accordance with a general embodiment of the invention. VOA 100 includes a conventional waveguide structure having a core or confinement region (hereinafter "core") 102 surrounded by a cladding region (hereinafter "cladding") 104. Core 102 extends along a longitudinal axis (indicated by arrow 105) and is oriented in substantially parallel relation with an upper surface 106 of cladding 104 (the terms "upper", "lower", "vertical" and "horizontal" are used herein for the purpose of clarity, and are not intended to limit the device to any particular orientation). Cladding 104 is longitudinally coextensive with core 102, and may be constructed from multiple layers (such as lower layer 108 and upper layer 110) to facilitate fabrication of VOA 100, as will be discussed below in connection with FIGS. 5 and 6. The cross-sectional size and shape of core 102 may be selected to accommodate the mode (spatial distribution of optical energy) at the input fiber (not shown in FIG. 1) so as to minimize coupling losses.

VOA 100 further includes a thermal source 112 and a heat sink 114 arranged in opposed relation about core 102, with thermal source 112 contacting upper surface 106 of cladding 104 and heat sink 114 contacting a lower surface 116 of cladding 104. As is shown in FIG. 2, which depicts a cross-sectional view taken along line 2—2 of FIG. 1, thermal source 112 and heat sink 114 define therebetween a first or vertical axis (indicated by arrow 202) transverse to the longitudinal axis of core 102. Thermal source 112 may comprise, for example, a thin film heater fabricated from a segment of electrically resistive material, such as nichrome (NiCr), across which a voltage signal is selectively applied, as indicated in FIG. 1. Heat sink 114 may comprise a device substrate fabricated from a glass or other material having a relatively high thermal conductivity so as to efficiently remove heat from cladding 104. As will be discussed in greater detail below, thermal source 112 and heat sink 114 are configured to generate a controllable temperature gradient in cladding 104 and core 102 along the vertical (first) axis. This temperature gradient produces an asymmetric spatially varying refractive index profile, which causes at least a portion of the optical energy propagating along the longitudinal axis of core 102 to be deflected in the direction of heat sink and extracted from core 102.

Figure 5:
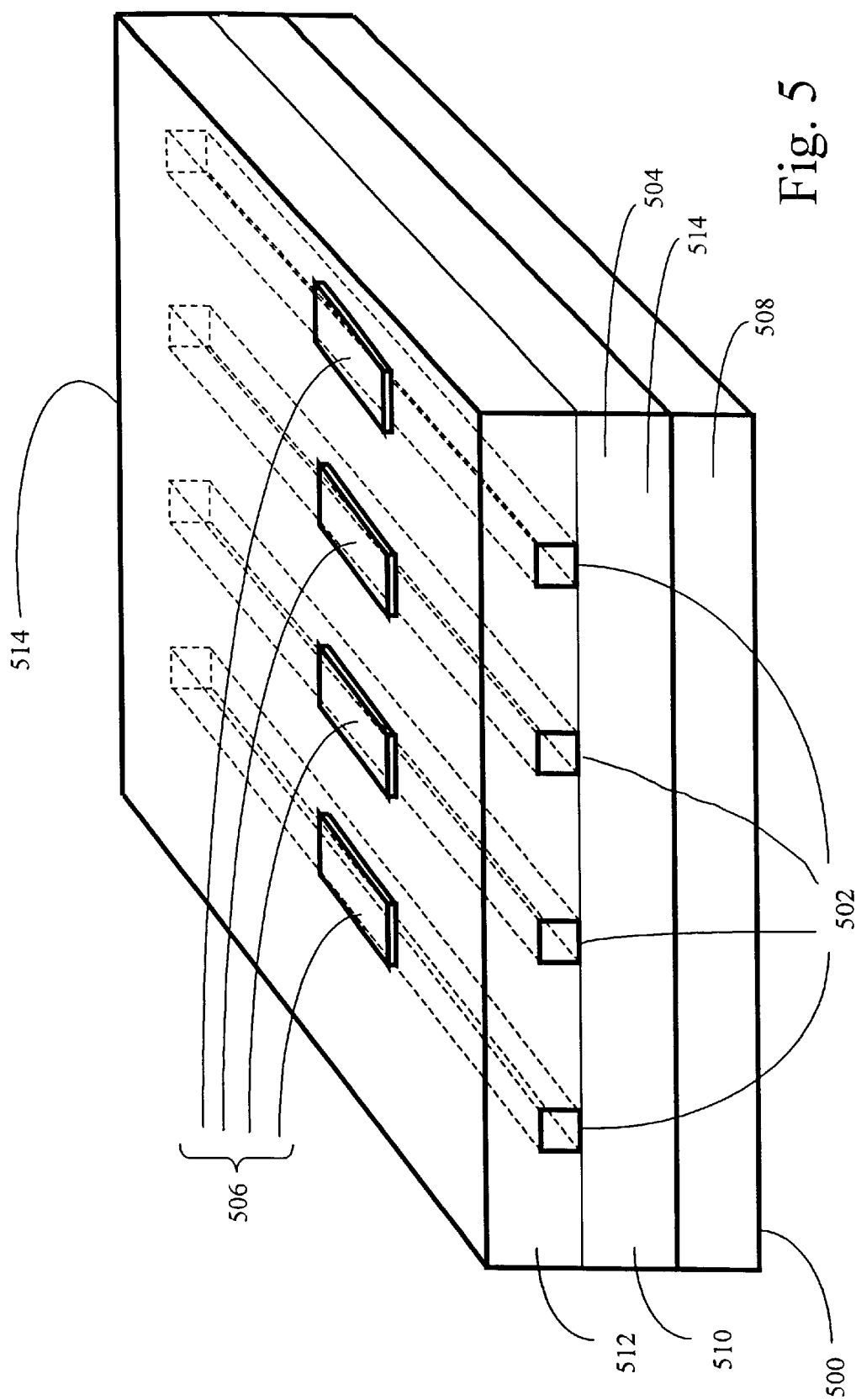
FIG. 5 is a schematic view of a more specific embodiment of the FIG. 1 device.

It will be noted that VOA 100 is depicted as having only a single waveguide structure. However, the invention contemplates attenuator devices having an array of multiple waveguide structures comprising a plurality of horizontally spaced cores in mutually parallel relationship embedded in the cladding. In such devices, each waveguide is associated with a separate thermal source aligned therewith to enable independent control of the attenuation of each optical channel. A specific embodiment of the invention having plural independently controlled waveguides is depicted in FIG. 5 and discussed below. It should also be noted that although core 102 is shown as being fully surrounded or circumscribed by cladding 104, alternative embodiments wherein core 102 is substantially but not fully surrounded by cladding 104 are within the scope of the invention.

It will be further noted that alternative embodiments of the invention may omit heat sink 114; however, omission of heat sink 114 may reduce overall VOA 100 performance.

Core 102 and cladding 104 are preferably fabricated from thermo-optic materials (materials which exhibit a change in refractive index in response to an increase or decrease in temperature) having negative thermo-optic coefficients (dn/dT<0, where n is the local refractive index and T is temperature), although alternative embodiments may utilize a material for core 102 or cladding 104 having a positive thermo-optic coefficient, such as glass. The materials of core 102 and cladding 104 will preferably comprise polymers, although other materials having suitable properties may be employed. To enable confinement of optical energy traveling along core 102, cladding 104 is fabricated from a material having a refractive index slightly lower (under normal conditions) than the refractive index of core 102. In a typical implementation of VOA 100, the difference Δn between the refractive indices of the core and cladding will be approximately 0.004–0.006. As is well known in the art, the refractive index difference between core 102 and cladding 104 produces confinement of optical energy traveling along the longitudinal axis of core 102 via multiple internal reflections at the core-cladding boundaries.

A significant shortcoming of prior art switching, modulating or attenuating devices based on the thermo-optic effect is that such devices are known to be sensitive to variations in ambient temperature, sometimes requiring carefully controlled cooling and/or heating of the device package to ensure reliable operation. In particular, waveguides constructed from core and cladding materials having different thermo-optic coefficients (dn/dT) will exhibit changes in Δn and hence confinement when the waveguide temperature is uniformly raised or lowered. In order to avoid sensitivity of VOA 100 to changes in the ambient temperature, the materials for core 102 and cladding 104 are selected to have substantially equal thermo-optic coefficients, at least within the operating temperature range of interest; in this manner, the refractive indices of core 102 and cladding 104 increase or decrease by approximately equal amounts with a corresponding decrease or increase in temperature, leaving the Δn and hence the waveguide confinement substantially unchanged.

Additional criteria for selection of materials for core 102 and cladding 104 include the following: (1) low and uniform absorption losses across the optical energy spectrum of interest (e.g., 1500–1610 nanometers for telecommunications applications); (2) mechanical and optical property stability; (3) low glass transition temperature, and; (4) low optical birefringence. Examples of materials which generally satisfy the foregoing criteria and hence which are suitable for use in VOA 100 are discussed below in connection with FIGS. 5 and 6.

Figure 3:
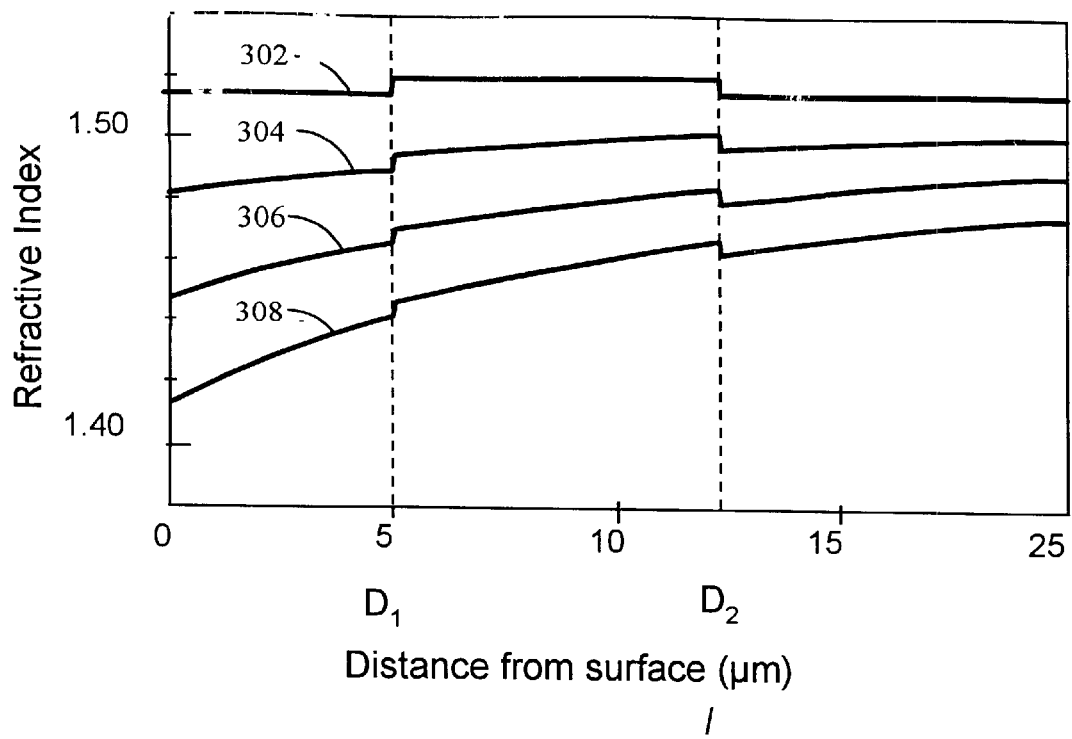
FIG. 3 is a graph showing several exemplary vertical refractive index profiles developed within the FIG.1 device, each profile corresponding to a different level of thermal source actuation.

The operation of VOA 100 may best be understood with reference to FIG. 3, in which exemplary refractive index profiles developed along the first or vertical axis are shown for varying degrees of actuation of thermal source 112. The profiles are plotted as the local refractive index versus distance d from surface 106 along the vertical axis. A first refractive index profile 302 corresponds to a normal or non-actuated condition wherein thermal source 112 is not providing any heating, and consequently the temperature along the vertical axis is substantially uniform. Profile 302 consists of a flat region from d=0 to d=$D_1$, representative of a uniform local refractive index across the upper portion of cladding 104; a sharp increase at d=$D_1$, representative of the increase in local refractive index at the upper (proximal) cladding/core boundary; a second flat region from $D_1$, to $D_2$ representative of a uniform local refractive index across core 102; a sharp decrease at d=$D_2$ representative of the decrease in local refractive index across the lower (distal) cladding/ core boundary; and, a third flat region extending beyond $D_2$ representative of a uniform local refractive index across the lower portion of cladding 104. Because the local refractive index across core 102 uniformly exceeds the local refractive index of cladding 104 adjacent to the proximal and distal core/cladding boundaries, optical energy traveling along core 102 is confined thereto.

Second refractive index profile 304 corresponds to a "low actuating" condition, wherein thermal source 112 is operated to provide a relatively small degree of heating. Heat generated by thermal source 112 (typically by resistive heating) flows along the vertical axis from cladding upper surface 106 through the upper portion of cladding 104, core 102 and lower portion of cladding 104 and into heat sink 114. The flow of thermal energy through the cladding 104 and core 102, which is limited by the thermal conductivities of the materials from which VOA 100 is formed, creates a temperature gradient along the vertical axis, the temperature being highest at a location immediately below thermal source 122 and decreasing steadily in the downward direction. Owing to the thermo-optic properties of core 102 and cladding 104, the temperature gradient produces a reduction in local refractive indices relative to the normal or non-actuating condition, the reduction being greatest where the temperature is highest and decreasing with increasing distance along the vertical axis. The temperature gradient results in a tilting of the refractive index profile of core 102, with the local refractive index increasing along the vertical axis from the proximal core/cladding boundary to the distal core/cladding boundary. This tilting is sufficient to depress the local refractive index in the upper portion of core 102 (that portion adjacent to the proximal core/cladding boundary) relative to the local refractive index of cladding 104 located immediately adjacent to the distal core/cladding boundary. The effect of the decreased local refractive index (relative to that of cladding 104 adjacent to the distal boundary) in a portion of core 102 is to cause, via refractive processes, a portion of the optical energy propagating along core 102 to be deflected downwardly out of core 102 in the direction of heat sink 114. In this manner, attenuation of the optical signal within core 102 is achieved. It is noted that the asymmetry of refractive index profile 304 effectively prevents optical energy from leaking upwards toward thermal source 112, as the local refractive index of the upper portion of cladding 104 is uniformly lower than the local refractive index within core 102. Instead, the optical energy is preferentially extracted downwards toward heat sink 114 in the direction indicated by arrow 202, into the higher local refractive index of the lower portion of cladding 104.

Refractive index profiles 306 and 308 respectively correspond to a "medium actuating" condition (where thermal source 112 is operated to provide a medium degree of heating) and a "high actuating" condition (where thermal source 112 is operated to provide a relatively high degree of heating). Increasing the amount of heating provided by thermal source 112, as represented by the progression from profile 304 to 306 and from profile 306 to 308, creates a steeper temperature gradient and more pronounced tilting of the refractive index profile of core 102. As the extent of tilting of the refractive index profile becomes greater, the local refractive index of a progressively larger portion of core 102 is depressed relative to the local refractive index of cladding 104 adjacent to the distal core/cladding boundary, leading to extraction of a larger portion of optical energy from core 102 through the distal core/cladding boundary and into the lower portion of cladding 104. The amount of optical energy extracted from core 102 may be generally expressed to be a function of the difference $\Delta n_{perturbation} - \Delta n_{confinement}$, where $\Delta n_{perturbation}$ is the difference between the local refractive index of cladding 104 immediately adjacent to the distal core/cladding boundary and the local refractive index of cladding 104 immediately adjacent to the proximal core/cladding boundary ($\Delta n_{perturbation}$ characterizing the degree of refractive index tilting arising from the presence of a temperature gradient), and $\Delta n_{confinement}$ is the difference between the local refractive index of core 102 and the local refractive index of cladding 104 immediately adjacent to the distal core/cladding boundary ($\Delta n_{confinement}$ characterizing the degree of vertical confinement and being substantially insensitive to the temperature gradient). In this manner, the attenuation of optical energy propagating through core 102 may be controlled by adjusting the operation of thermal source 112. Those skilled in the art will appreciate that when thermal source 112 is operated to provide a sufficiently high amount of heating, substantially all of the optical energy will be extracted from core 102 via refraction and diffraction.

It should be noted that optical energy is not deflected in the horizontal or lateral plane (indicated by arrow 204 in FIG. 2) because the heating provided by thermal source 112 does not substantially affect lateral waveguide confinement. The temperature gradient along the lateral axis is significantly smaller than the gradient along the vertical axis, and may be controlled by adjusting the width of thermal source 112. A thermal source having a width close to or exceeding the width of core 102 will produce a substantially uniform lateral temperature profile across core 102 and portions of cladding immediately adjacent thereto. This condition will result in refractive index decreases of similar magnitude for horizontally aligned portions of the core 102 and cladding 104, thereby preserving horizontal waveguide confinement. Minimization of the horizontal temperature gradient may also be achieved by adjusting the geometry and configuration of thermal source 112, such as by use of the "pedestal" configuration discussed below in connection with FIG. 7(a), or by increasing the depth of core upper layer 110.

Figure 4:
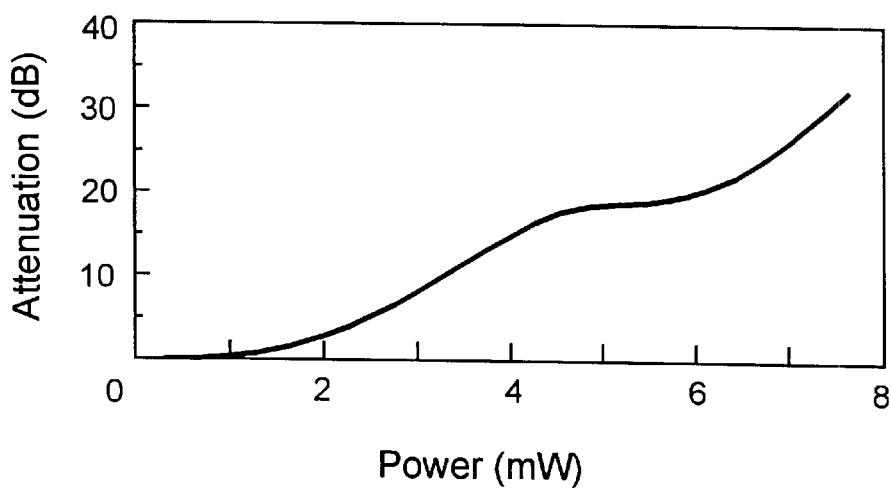
FIG. 4 is a graph showing the amount of attenuation achieved within the FIG. 1 device versus thermal source actuation.

FIG. 4 depicts the relationship between the amount of actuation, expressed as the power consumed by thermal source 112 and the resultant attenuation of optical energy propagating along core 102, expressed in decibels, measured in connection with a exemplary implementation of VOA 100. The amount of attenuation is shown to increase monotonically with increasing thermal source actuation, with the attenuation-power consumption relationship being quasi-linear over a substantial portion of the depicted power consumption range. This relationship between attenuation and thermal source actuation is representative of the ability of VOA 100 to provide precise control of the optical power over an extended range of attenuation (0–30 dB) by simply adjusting the power supplied to thermal source 112. Those skilled in the art will also observe that high degrees of attenuation may be achieved with relatively low power consumption. For example, an attenuation of 15 dB requires only about four milliwatts (4 mW) of power.

Examination of the attenuation-power consumption curve of FIG. 4 reveals a plateau region beginning at a power consumption of approximately 4.5 mW. It has been postulated that the decrease in the attenuation efficiency represented by the plateau region results from reflection of a portion of the deflected optical energy from the cladding/ substrate boundary, the reflected light being re-coupled into core 102. It may be possible to reduce this effect through optimization of the geometry and materials of VOA 100.

Specifically, reflection from the cladding/substrate boundary may be reduced or eliminated by matching the refractive indices of the cladding and substrate materials, or alternatively, by interposing a relatively thick adhesion layer between the cladding and substrate, the refractive index of the adhesion layer being matched to that of the cladding. Another possible solution to the above-described "re-coupling"problem involves roughening the surface of the substrate contacting the cladding, thereby randomizing the angle of reflection of the reflected optical energy, which in turn reduces the fraction of the reflected optical energy re-coupled into core 102. Yet another solution to the re-coupling problem consists of disposing a set of longitudinally spaced "reflection blockers" at or proximal to the cladding/substrate boundary. The reflection blockers comprise vertically oriented specular reflectors which avoid re-coupling into core 102 by redirecting optical energy such that it is not reflected from the cladding/substrate boundary and/or by redirecting optical energy reflected at the cladding/substrate boundary such that it is not re-coupled into core 102.

The fabrication of a specific embodiment of the invention will now be discussed in connection with FIGS. 5 and 6. FIG. 5 depicts a VOA 500 closely similar in many respects to VOA 100 of FIGS. 1 and 2. In contrast to FIG. 1, however, which depicts only a single waveguide, VOA 500 is provided with an array of four waveguides comprising elongated thermo-optic cores (individually and collectively denoted as 502) set in thermo-optic cladding 504, each waveguide carrying a separate optical signal. Cores 502 are arranged in co-planar, mutually parallel relation with typical horizontal spacing of 250 $\mu$m between adjacent cores. Each core 502 is substantially aligned and in thermal association with a thermal source (individually and collectively denoted as 506) uniquely corresponding thereto, each thermal source 506 being operable to generate a temperature gradient in the associated core 502 along a vertical or first axis extending between thermal source 506 and substrate 508, which serves as a heat sink, which in turn causes at least a portion of the optical energy traveling along core 502 to be deflected downwardly in the direction of substrate 508 and thereby extracted from core 502.

In a preferred implementation, substrate 508 is formed from a commercially available glass material such as Corning® 1734 flat glass, but may alternatively be formed from any suitable material having sufficiently high thermal conductivity to rapidly conduct heat away from cladding 504. The thickness of substrate 508 will be chosen in view of mechanical, thermal and processing requirements. Typical substrate thickness for VOA 500 will be about 1000 $\mu$m.

Figure 6:
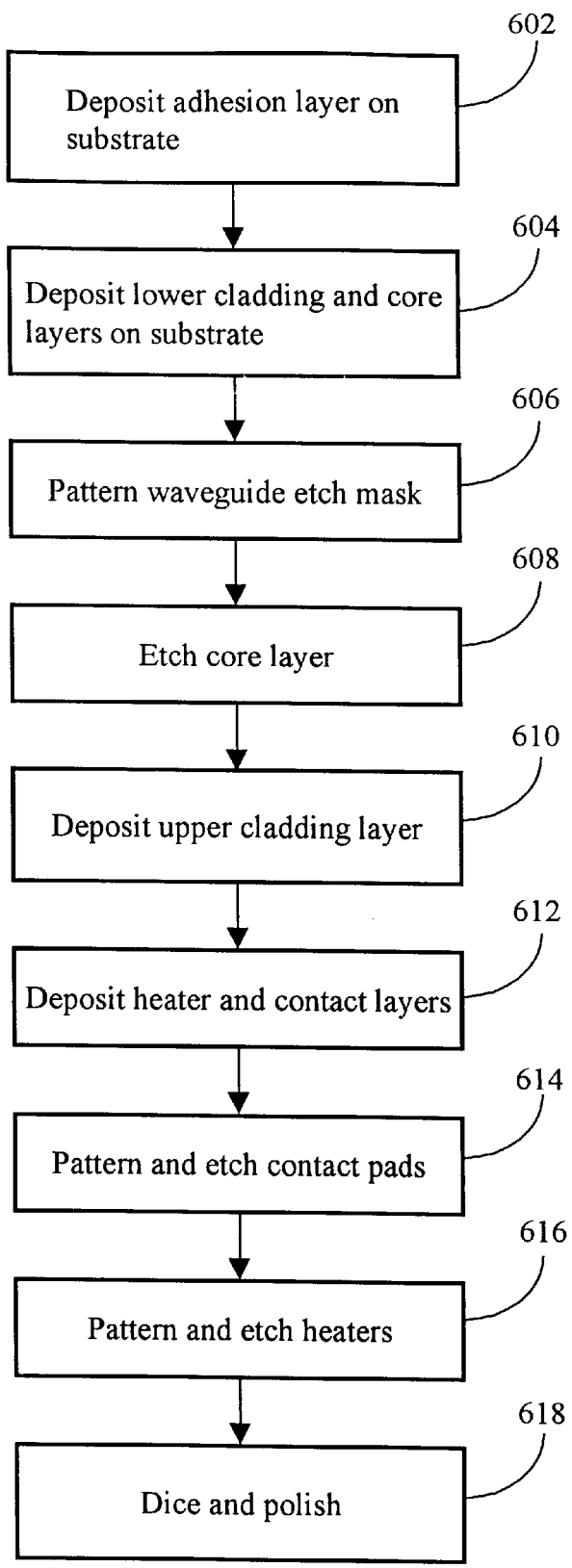
FIG. 6 is a flowchart depicting the steps of a method for constructing the FIG. 5 device.

In the first step 602 of the VOA fabrication method depicted by the FIG. 6 flowchart, an adhesion layer is deposited on substrate 508 to promote adhesion between substrate 508 and a lower cladding layer 510. The adhesion layer will typically comprise a commercially available substance such as AZ 4330 positive photoresist, and is preferably deposited to a thickness of about 3 $\mu$m.

Next, in step 604, planar lower cladding layer 510 and a planar core layer are sequentially deposited on substrate 508. Lower cladding layer 510 will preferably comprise Norland Optical Adhesive 68 (NOA 68, available from Norland Products of New Brunswick, NJ), which has a refractive index of 1.534 and a thermo-optic coefficient of $3.3 \times 10_{-4}$, although other optically transparent polymeric or non-polymeric materials having suitable properties may be substituted. A standard polymer layer deposition procedure may be employed for deposition of lower cladding layer 510, comprising viscosity adjustment prior to deposition, spinning, and curing with ultraviolet light (which cross links the polymer chains and creates a robust layer). Other methods which may be utilized to deposit lower cladding layer 510 include meniscus, extrusion, spray, dip, evaporation coating, or sputtering. Lower cladding layer 510 may be deposited to a preferred thickness of about 9.5 $\mu$m.

A core layer is then deposited on top of lower cladding layer 510. The core layer will preferably be formed from a material having the same polymer structure as lower cladding layer 510 (e.g., NOA 68) to which a refractive index-raising additive has been added. The additive will preferably raise the refractive index of the core layer by about 0.006 relative to lower cladding layer 510, yielding a core layer refractive index of 1.540 for the NOA 68 example. Because the basic chemical structures of the core layer and lower cladding layer 510 are generally the same, their thermo-optic coefficients are matched, thereby making the refractive index difference substantially invariant with ambient temperature. The core layer is preferably deposited by the standard deposition techniques alluded to above to a thickness of about 6.4 $\mu$m.

In the third step 606, aluminum is sputtered and patterned via lithography to form a reactive ion etching (RIE) mask for waveguide fabrication. The RIE mask features, which define cores 502, will preferably comprise parallel lines having a width of about 6.4 $\mu$m which run along the entire length of the mask. As referenced above, the lateral core spacing will typically be about 250 $\mu$m. The unmasked portions of the core layer (representing the regions between adjacent cores 502, are then removed by RIE, step 608. Other wet and dry etching techniques known in the art may be used in place of the RIE technique for defining cores 502.

The cross-sectional dimensions and refractive index of cores 502 will preferably be selected to produce single mode operation in the optical energy wavelengths of interest. In the foregoing example, cores 502 will have a square cross-section with a width and height of 6.4 $\mu$m, which produces single mode operation for optical energy having a wavelength of 1.55 $\mu$m, which is a typical wavelength used for telecommunications applications.

Next, in step 610 the RIE etch mask is removed and an upper cladding layer 512 is deposited on top of lower cladding layer 510 and cores 502, thereby forming buried channel waveguides. The material of upper cladding layer 512 may be identical to that of lower cladding layer 510 (e.g., NOA 68 for the example discussed above). Deposition of upper cladding layer 512 may be accomplished by the same standard polymer deposition technique used for deposition of lower cladding layer 510 and the core layer. Upper cladding layer 512 is preferably deposited to a thickness of about 10 $\mu$m.

In alternative embodiments of VOA 500 upper cladding layer 512 may be fabricated from two or more sub-layers in order to optimize various properties of upper cladding layer 512. For example, upper cladding layer 512 may comprise a upper sub-layer of a first material and a lower sub-layer of a second material, the first material selected to have a low refractive index in order to provide more effective optical isolation of the mode from thermal source 506, and the second material selected to provide good confinement of the mode. In this manner, it may be possible to construct VOA 500 with a thinner overall upper cladding layer 512 thickness (which advantageously increase the thermal gradient obtainable within core 102) and/or to improve other mechanical or optical properties of VOA 500.

Next, NiCr (used to form thermal sources 506) and gold layers (used to form electrical contact pads, which are not depicted in the figures) are sequentially deposited by sputtering on top of upper cladding layer 512 to form a two-layer metal structure, step 612. The NiCr layer will be deposited to a thickness sufficient to achieve the desired electrical resistance of thermal sources 506. For thermal sources 506 having typical dimensions of 13 μm wide by 300 μm length, the target electrical resistance is 300Ω.

In step 614, gold electrical contact pads, for electrically connecting thermal sources to lines carrying the thermal source control signals, are defined and formed using conventional photolithography techniques. Briefly, photoresist is deposited on the gold layer by spinning and exposed through a contact pad mask. The exposed regions of the gold layer are subsequently removed using a gold etch solution, thereby defining the contact pad. Typical dimensions of the contact pads are 200 μm by 200 μm.

Thermal sources 506 are then formed using conventional photolithography techniques, step 616. Photoresist is deposited on the NiCr layer and exposed through a thermal source mask. The thermal source mask is preferably positioned to align the thermal source features with the underlying cores 502, such that the resultant thermal sources 506 (i.e., thin film heaters) have their longitudinal axes centered above and parallel to the longitudinal axes of corresponding cores 502. The exposed regions of the NiCr layer are then removed using a NiCr etch solution to thereby define thermal sources 506. Typical dimensions for thermal sources 506 will be 13 gm width by 300 μm length.

It is to be appreciated that, in a typical production environment, multiple VOA 500 devices may be formed simultaneously on a common substrate. In step 618, individual VOA 500 devices are separated by dicing the common substrate. End faces 514 are then polished to enable coupling of optical energy in and out of cores 502.

While specific techniques for electrically connecting thermal sources 506 to a control signal source have not been described herein, those skilled in the art will recognize that various well-known methods and structures may be employed for this purpose.

Figure 7A:
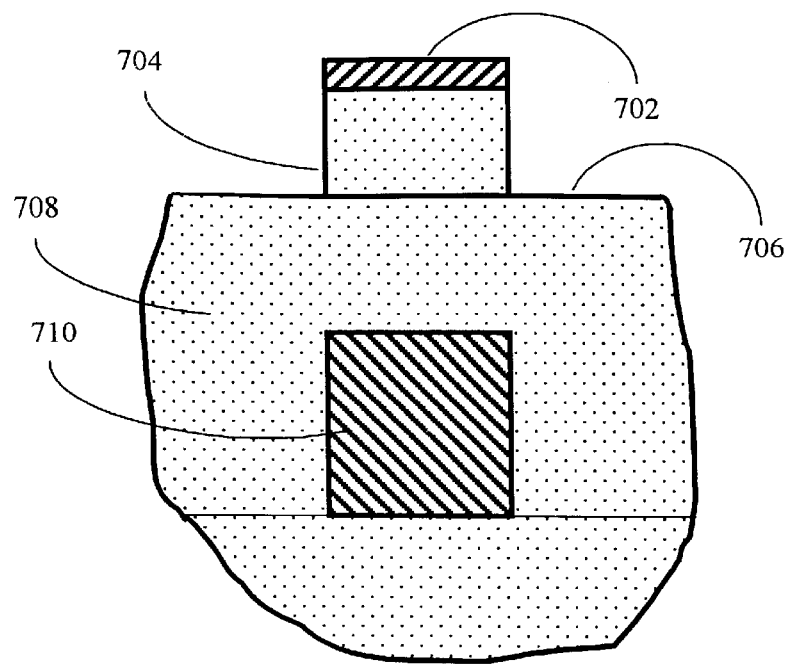
FIGS. 7(a) and 7(b) depict alternate thermal source geometries and arrangements for the FIG. 5 device.
Figure 7B:
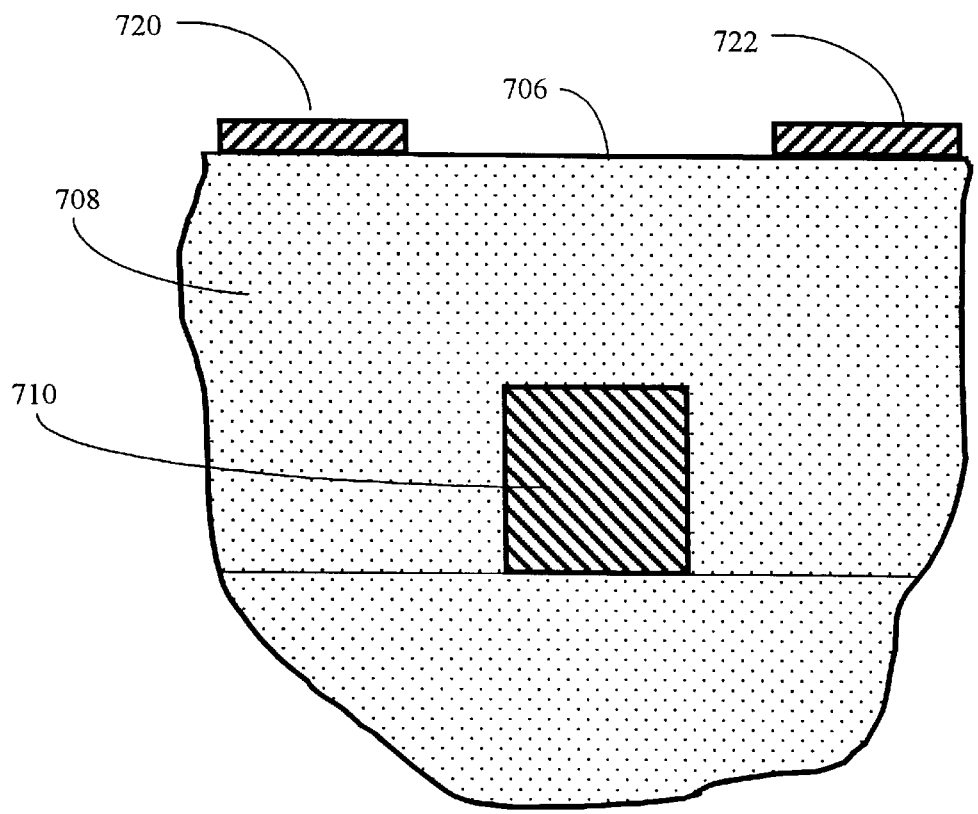

FIGS. 7(a) and 7(b) are fragmentary cross-sectional views depicting alternative geometries and configurations of the thermal source. In FIG. 7(a), a thermal source comprising a thin film heater 702 is positioned atop a pedestal region 704 extending upwardly from upper surface 706 of cladding 708 and is in substantial vertical alignment with core 710. It is believed that the geometry depicted in FIG. 7(a) will tailor the flow of thermal energy from heater 702 to the heat sink (not shown) such that the temperature gradients produced within core 710 and surrounding cladding 708 are maximized along the vertical axis and minimized along the horizontal axis, which in turn will increase device efficiency (in terms of power consumed per unit of attenuation). Pedestal 704 may be formed, for example, by using heater 702 as a mask while etching the upper margins of cladding 708 by the required amount.

FIG. 7(b) depicts another alternative configuration of the thermal source wherein two horizontally spaced thin film heaters 720 and 722 are employed in place of a single heater. Thin film heaters 720 and 722 are positioned in contact with upper surface 706 of cladding 708 and are horizontally offset by equal distances from the centerline of core 710. Heaters 720 and 722 are preferably interconnected such that each heater received the same thermal source control signal (e.g., an identical voltage). This arrangement offers the advantage of locating heaters 720 and 722 a greater overall distance from core 710, thus further reducing absorption of the optical mode by the thermal source.

It will be realized by those skilled in the art that other geometries, arrangements, and sizes of thin film heaters may be utilized to optimize various operational and design aspects of the VOA. For example, multiple heaters may be placed over a waveguide core to increase the maximum achievable attenutaion.

According to yet another embodiment of the invention, a VOA (not depicted) is provided wherein each waveguide has two or more longitudinally spaced thermal source zones, each zone being associated with a thin film heater or other thermal source. At the thermal source zone located upstream in the optical path, a portion of the optical energy refracted by the thermo-optic effect is reflected upwardly at the distal core/cladding boundary and remains within the core. The longitudinal spacing and size of the thermal source(s) located downstream in the optical path is selected such that the downstream thermal source acts to increase the vertical momentum component of the previously reflected wavefront, thereby avoiding cancellation occurring between the reflected and diffracted wavefronts at the downstream thermal source zone(s) and increasing the attenuation efficiency of the VOA.

FIG. 8 schematically depicts an attenuation system 800 in accordance with the present invention. Attenuation system 800 includes a VOA 802 of similar description to VOA 500 described above in connection with FIGS. 5 and 6. VOA 802 is provided with a plurality of waveguides individually comprising an elongated thermo-optic core embedded in a cladding. Each waveguide has in operational association therewith a thermal source (individually and collectively denoted as 804) for generating a thermal gradient across the core and surrounding cladding to enable the controlled extraction of optical energy in the direction away from thermal source 804 in the manner described above. To enable measurement of the amount of optical energy (i.e., an optical power level) in the core at a location downstream of the thermal source, each waveguide is optically coupled to a conventional optical sensor or detector (individually and collectively denoted as 808) configured to measure the optical power level within the core and to responsively generate an output signal representative of the measured power level. Coupling of the waveguides to the sensor 808 array (each sensor 808 uniquely corresponding to a waveguide) may be achieved using optical taps or similar expedient well known in the art. Sensors 808 may comprise, for example, an integrated germanium detector array formed on a separate platform 809 and attached to VOA device 802 using conventional alignment and attachment techniques.

The sensor output signals are conveyed as input to control circuitry 810, which is configured to determine, for each waveguide, the amount of attenuation required to meet a set of predetermined conditions (e.g., equalization of optical power levels among the several waveguides). Control circuitry 810 is further configured to apply a thermal source control signal to each thermal source 804, the signal being of appropriate strength to effect the required amount of attenuation. As is known in the art, the thermal source control signals applied to thermal sources 804 may be determined by control circuitry 810 in accordance with pre-established input-output relationships, and may be adjusted on a continuous basis to reflect variations in the downstream optical power, as measured by sensors 808.

VOA 802 may be coupled to input optical fibers 812 (which carry the input optical signals) and output optical fibers 814 (which carry the post-attenuation output optical signals) using any one of a variety of coupling techniques. Input and output optical fibers 812 and 814 will typically comprise standard commercially available fibers, such as the SMF-28™ single mode fiber available from Corning Incorporated of Corning, NY. Coupling of fibers 812 and 814 to VOA 802 may be accomplished by using a silicon submount (not shown) having V-grooves for receiving and positioning the fiber ends. The submount will preferably include means for first positioning and attaching thereto a set of guide fibers, which are in turn employed to precisely align the submount with VOA 802. Following alignment and attachment of VOA 802 to the submount, input and output optical fibers 812 and 814 are attached to the submount/VOA 802 assembly using the V-grooves formed in the submount to align the fibers with the VOA 802 waveguides. Input and output coupling losses may be reduced by pigtailing the optical fiber ends and filling the gaps between the fibers and the waveguides using a UV-curing polymer or other suitable material having an index substantially equal to the index of the waveguide core material.

It will be recognized by those skilled in the art that, while the invention has been described above in terms of preferred embodiments, it is not limited thereto. Various features and aspects of the above described invention may be used individually or jointly. Further, although the invention has been described in the context of its implementation in a particular environment and for particular applications, e.g., optical communications, those skilled in the art will recognize that its usefulness is not limited thereto and that the present invention can be beneficially utilized in any number of environments and implementations. Accordingly, the claims set forth below should be construed in view of the full breadth and spirit of the invention as disclosed herein.

What is claimed is:

1. An optical attenuator device operable in a non-actuated state and an actuated state, comprising:
    at least one elongated core for propagating optical energy along a longitudinal axis thereof;
    a cladding surrounding the core, the cladding having in the non-actuated state a refractive index depressed relative to a refractive index of the core such that the optical energy is substantially confined under normal conditions to the core, the core and cladding having matched thermo-optic coefficients;
    a thermal source positioned above the core, the thermal source in the actuated state generating a temperature gradient along a vertical axis extending through the core sufficient to cause the refractive index within at least a portion of the core to be depressed relative to the refractive index of the cladding downwardly adjacent to the core, thereby causing a portion of the optical energy to be deflected downwardly away from the thermal source and extracted from the core.

2. The device of claim 1, wherein the portion of optical energy extracted from the core in the actuated state is controlled by adjusting a thermal source control signal applied to the thermal source.

3. The device of claim 1, further comprising a substrate in thermal contact with a lower major surface of the cladding.

4. The device of claim 3, wherein the refractive index of the substrate is approximately matched to the refractive index of the cladding adjacent to the substrate.

5. The device of claim 1, further comprising a substrate and an adhesion layer interposed between a lower major surface of the cladding and the substrate, the adhesion layer being in thermal contact with the substrate and having a refractive index approximately matched to the refractive index of the cladding adjacent to the substrate.

6. The device of claim 1, wherein the thermal source comprises a thin film heater disposed on an upper major surface of the cladding and overlying the core.

7. The device of claim 6, wherein the thermal source has a longitudinal centerline substantially aligned with a longitudinal centerline of the core and a width at least equal to a width of the core.

8. The device of claim 1, further comprising a pedestal region extending upwardly from an upper major surface of the cladding, and wherein the thermal source comprises a thin film heater positioned on an upper surface of the pedestal region.

9. The device of claim 8, wherein the pedestal region is vertically aligned with the core.

10. The device of claim 1, wherein the core and cladding comprise optically transparent polymeric materials.

11. The device of claim 1, wherein the cladding comprises an upper layer and a lower layer.

12. The device of claim 1, wherein the refractive index of the core exceeds the refractive index of the cladding by at least 0.004 in the non-actuated state.

13. The device of claim 1, wherein the core is sized to limit the optical energy to a single mode.

14. The device of claim 1, wherein the thermal source comprises a plurality of thin film heaters.

15. A multi-channel optical attenuator device comprising:
    a plurality of elongated cores, each for propagating optical energy along a respective longitudinal axis thereto;
    a cladding surrounding each of the cores, the cladding having a refractive index depressed relative to a refractive index of the cores such that the optical energy is substantially confined in a non-actuated condition to the cores, the cores and cladding having matched thermo-optic coefficients;
    a plurality of thermal sources, each being positioned above and being uniquely associated with one of the plurality of cores, each of the thermal sources when in an actuated state generating a temperature gradient along a vertical axis extending through the corresponding core sufficient to cause the refractive index within at least a portion of the core to be depressed relative to the refractive index of the cladding downwardly adjacent to the core, thereby causing a portion of the optical energy to be deflected downwardly away from the thermal source and extracted from the core.

16. The device of claim 15, wherein the plurality of cores are arranged in mutually parallel relation and define a horizontal plane substantially parallel to an upper major surface of the cladding.

17. The device of claim 15, wherein the portion of optical energy extracted from each of the plurality of cores is controlled by adjusting a thermal source control signal applied to the associated thermal source.

18. A variable optical attenuator system, comprising:
    an optical attenuator device operable in a non-actuated state and an actuated state, including:
        at least one elongated core for propagating optical energy along a longitudinal axis thereof;
        a cladding surrounding the core, the cladding having in the non-actuated state a refractive index depressed relative to a refractive index of the core such that the optical energy is substantially confined under normal conditions to the core, the core and cladding having matched thermo-optic coefficients;
        a thermal source positioned above the core, the thermal source in the actuated state generating a temperature gradient along a vertical axis extending through the core sufficient to cause the refractive index within at least a portion of the core to be depressed relative to the refractive index of the cladding downwardly adjacent to the core, thereby causing a portion of the optical energy to be deflected downwardly away from the thermal source and extracted from the core;
    an optical detector for measuring a power of the optical energy propagating in the core; and control circuitry for applying a control signal to the thermal source in accordance with the measured power.

19. The system of claim 18, wherein the optical detector is located downstream in the optical path from the thermal source.

20. The system of claim 19, wherein the thermal source comprises a thin film heater, and the control signal comprises a voltage signal.

21. The system of claim 20, wherein the voltage signal may be varied over a continuous range to precisely control the portion of optical energy extracted from the core.

22. The system of claim 18, wherein the optical detector is optically coupled to the core by an optical tap.

23. The system of claim 18, wherein the optical attenuator device includes a plurality of cores, each for propagating optical energy along a longitudinal axis thereof, each one of the plurality of cores having uniquely associated therewith a thermal source and an optical detector coupled to the control circuitry, the control circuitry being configured to apply separate thermal source control signals to each of the thermal sources such that the portion of optical energy extracted from each core is independently controllable.

* * * * *